United States Patent [19]

Bezruk et al.

[11] 4,067,735
[45] Jan. 10, 1978

[54] METHOD OF MAKING BULK POROUS ANODES FOR ELECTROLYTIC CAPACITORS

[76] Inventors: Viktor Ivanovich Bezruk, Fontanka, 183, kv. 6; Mikhail Nikolaevich Dyakonov, Lesnoi prospekt, 37, korpus 6, kv. 63; Ivan Stepanovich Lavrov, Kirovsky prospekt, 25, kv. 37; Alexandr Nikolaevich Lazarev, Yaroslavsky prospekt, 6, korpus 1, kv. 6; Iosif Vulfovich Netupsky, Zastavskaya ulitsa, 28, kv. 23, all of Leningrad, U.S.S.R.

[21] Appl. No.: 682,315

[22] Filed: May 3, 1976

[51] Int. Cl.$^2$ ............................................. B22F 3/00
[52] U.S. Cl. ........................................ 75/211; 75/200
[58] Field of Search ..................... 75/200, 211, 222; 29/182.3

[56] References Cited

U.S. PATENT DOCUMENTS

| | | | |
|---|---|---|---|
| 3,403,303 | 9/1968 | Klein | 75/222 |
| 3,424,952 | 1/1969 | Vierow | 75/200 |
| 3,433,632 | 3/1969 | Elbert et al. | 75/222 |
| 3,473,915 | 10/1969 | Pierret | 75/200 |
| 3,653,882 | 4/1972 | Petrasek et al. | 75/211 |
| 3,796,565 | 3/1974 | Hancock | 75/211 |

*Primary Examiner*—Brooks H. Hunt
*Attorney, Agent, or Firm*—Lackenbach, Lilling & Siegel

[57] ABSTRACT

A method of making bulk porous anodes for electrolytic capacitors consists of preparing a suspension of a valve metal powder, selected from the group consisting of tantalum, niobium and titanium in an amount of 30-250 parts by weight, a binding material, which is also a charger of powder metal particles, constituting a 0.2-1.5% aqueous solution of a salt selected from the group consisting of sodium and ammonium salts of carboxymethyl cellulose of celluloseglycolic acid in an amount of 10-35 parts by volume, and a dispersion medium being alcohol or acetone an amount of 15-30 parts by volume. Said suspension is subjected to the effect of an electric field established by a voltage applied to the electrodes and causing deposition of metal powder of the latter with a bulk porous body being thus formed, which is then sintered at a temperature of 1600-2000° C to produce a bulk porous anode.

Said method is intended for the production of electrolytic capacitors of various shapes and sizes.

3 Claims, No Drawings

METHOD OF MAKING BULK POROUS ANODES FOR ELECTROLYTIC CAPACITORS

The present invention relates to the production of radio components and more particularly to a method of making bulk porous anodes for electrolytic capacitors.

Known in the art is a method of making bulk porous anodes for electrolytic capacitors, consisting of forming on an electrode a bulk porous body of a powdered valve metal with the addition of a binding material thereto, selected from the group of organic polymers, followed by sintering the bulk porous body at a temperature ranging from 1600° to 2000° C by pressing it under a high pressure on special presses to produce anodes of cylindrical and rectangular form.

High pressure values used in the prior art method result in the deformation of powder particles, in increasing the density of bulk porous anodes thus obtained and, hence, in decreasing the specific capacity thereof, i.e. in decreasing the charge stored by the capacitor with such anode.

Besides, for producing electrolytic capacitors of high capacitance bulky anodes are required, the use of which in producing capacitors increases the size and weight of the latter and makes them more expensive.

A sufficiently high percentage of a binding material (0.6–2%) is added to the powdered valve metal.

High percentage of a binding material in powdered metal requires an additional special sintering operation for the removal of decomposition products, thus making the production process more complicated.

Production of bulk porous anodes of various sizes requires the use of appropriate pressing equipment (a separate punch, die and other tools) for each particular size of anode which also adds to the complexity of the technological process and diminishes the equipment efficiency.

Bulk porous anodes produced by pressing are characterized by non-uniform structure limiting the frequency range of electrolytic capacitors, based on said anodes, to 20 kHz.

The presence of sharp edges typical of pressed anodes of cylindrical or rectangular form in electrolytic capacitors using epoxy compounds requires a higher consumption of compounds, which results in increasing capacitor size and in decreasing the specific charge thereof.

Said pressing operation can be used only for piecewise production of bulk porous anodes, whereas batch or continuous production using the above - mentioned method involves considerable technological difficulties.

The disadvantages, referred to above, are particularly manifest in producing small-size bulk porous anodes.

It is an object of the present invention to provide a method of producing bulk porous anodes without a pressing operation.

Another object of the present invention is the provision a method of producing small-size bulk porous anodes having a high specific capacity.

Still another object of the present invention is to provide a simple and efficient method of producing bulk porous anodes.

A still further object of the present invention is to provide a method of producing bulk porous anodes having a uniform structure which allows the broadening of the frequency range of the electrolytic capacitor operation based on said anodes.

Yet another object of the present invention is to provide a method of producing bulk porous anodes compatible with the batch or continuous technology of producing anodes.

In accordance with said and other objects the essence of the method of the present invention resides in a method of producing bulk porous anodes for electrolytic capacitors, comprising the formation of an electrode of a bulk porous body of a powdered valve metal with the addition of a binding material thereto, selected from the group of organic polymers, followed by sintering the bulk porous body at a temperature ranging from 1600° to 2000° C. The formation of the bulk porous body is realized by depositing powdered metal on the electrode, under the effect of an electric field on a suspension consisting of the powdered valve metal in an amount of 30–250 parts by weight, a binding material being at the same time a charger of the powdered metal particles and constituting a 0.2–1.5% solution of sodium or ammonium salt of carboxymethyl cellulose or celluloseglycolic acid in an amount of 10–35 parts by volume and a dispersion medium, namely alcohol or acetone, in an amount of 15–30 parts by volume.

It is reasonable to form the bulk porous body on the electrode under the effect of an electric field established by a voltage in the range of 3–100 volts.

It is also reasonable to realize the process of bulk porous body formation during a time period of from 2 to 40 seconds.

Said method of making bulk porous anodes can find wide application in the production of electrolytic capacitors of various sizes, forms and capacitance.

The main advantage of said method is the absence of a high-pressure pressing operation.

By using the proposed method, the specific charge of the bulk porous anodes is increased, the size thereof is decreased and the consumption of powdered valve metal is reduced.

Besides, the bulk porous body produced by depositing has a sufficiently uniform structure, which allows widening of the working frequency range of electrolytic capacitors based on said anodes.

There is no need to change the technological equipment in producing bulk porous anodes of different sizes and forms, it is quite sufficient to change the voltage value and the effective time period of voltage application to the electrodes.

Said method of producing bulk porous anodes for electrolytic capacitors in realized as follows.

Initially an aggregatively stable suspension is prepared, consisting of a powdered valve metal in an amount of 30–250 parts by weight, a binding material selected from the group of organic polymers, and a dispersion medium being alcohol or acetone.

Such metals as tantalum, niobium or titanium are usually used as the valve metal.

The binding material being at the same time a charger of the powdered metal particles is a 0.2–1.5% solution of sodium or ammonium salt carboxymethyl cellulose or celluloseglycolic acid in an amount of 10–35 parts by volume.

The dispersion medium being acetone or alcohol is taken in an amount of 15–30 parts by volume.

The suspension of said composition is mixed in a bath fitted with electrodes.

Voltage is applied to the electrodes, the voltage value being in the range of 3–100 volts and the suspension is subjected to the effect of the thus established electric field for about 2-40 seconds, the voltage value and the time period of the electric field effect on the suspension being selected in accordance with the required dimensions of the bulk porous anodes being produced for the electrolytic capacitors.

The number of electrodes in the bath depends only on the required efficiency of the bulk porous anode production process.

Under the effect of said electric field, particles of the powdered metal enveloped by a polymer, being a carboxymethyl cellulose salt or celluloseglycolic acid, move toward one of the electrodes (toward the anode) and deposit thereon forming a bulk porous body, whose dimensions depend on the voltage value and the time period of voltage effect on the suspension.

On completion of the: deposition process, the electrodes are withdrawn from the suspension and placed into a chamber where sintering of the bulk porous body at a temperature of 1600° to 2000° C is performed and the formation process of a bulk porous anode is being completed.

The use of suspension components in the above-stated ratio is explained as follows.

The use of a smaller quantity of binding material results either in the absence of powder particles deposition on the electrode or in an insufficient quantity of deposited metal.

If the ratio of binding material in the suspension exceeds the above-specified range, it may cause such an undesirable phenomenon as flowing the deposited powder metal off the electrode.

A low amount metal of powder in the suspension will preclude the formation on the electrode of a bulk porous body of required dimensions and a weight ratio of the powder higher than specified above results in a very high density of the suspension, which, in its turn, makes mixing thereof more difficult.

An aggregatively-stable suspension can be prepared by using the dispersion medium (alcohol or acetone) in the above-specified proportions; the desired granulometry of the metal powder is then ensured in the deposition process.

The selection of the voltage value and of the time period of said voltage effect is determined by the dimensions of the anode to be produced.

A voltage value higher than 100 volts brings about considerable oxidation of the electrode.

The selection of a period of voltage effect on the suspension beyond the above-specified range results in substantial depletion of the suspension layer near the electrode, with the ensuring cessation of the metal powder deposition on the electrode.

The main advantage of the described method of producing bulk porous anodes for electrolytic capacitors is the elimination of the high-pressure pressing operation.

The specific charge of the anodes produced without pressing is 20-25% higher than that featured by anodes produced by the prior-art method.

For making capacitors of the same capacity, the production of anodes using the method of the present invention requires 20-25% less metal powder than the production of anodes by pressing.

Besides, an important advantage resides in that the structure of bulk porous anodes produced by depositing from a suspension is characterized by a considerably greater uniformity, which allows widening of the frequency range of electrolytic capacitors operation with said bulk porous anodes up to 50 kHz without impairing the electric characteristics thereof.

Said method allows production of bulk porous anodes of any configuration.

Moreover, when, using a wire electrode, it becomes possible to make a drop-shaped anode which greatly simplifies the technology of producing an electrolytic capacitor in an epoxy compound, decreases the dimensions of such capacitors and, hence, increases the specific charge thereof.

Production of bulk porous anodes of different dimensions by the herin-proposed method rules out the necessity of changing the technological equipment for each particular size, since the anode dimensions depend on the value of the voltage applied to the electrodes and also on the time period of said voltage effect.

In addition, piecewise, as well as batch or continuous, production of bulk porous anodes can be realized by the present method, depending on the required efficiency.

The method of producing bulk porous anodes can find wide application in the production of radio components.

For a better understanding of the present invention given hereinbelow are examples illustrating specific embodiments of the proposed method of producing bulk porous anodes for electrolytic capacitors.

EXAMPLE I

A suspension, consisting of 30 $cm^3$ of a 1.2% aqueous solution of sodium salt or carboxymethyl cellulose of cellulose-glycolic acid, used as a binding material, of 20 $cm^3$ of alcohol being a dispersion medium and of 200 g of tantalum powder, is carefully mixed in a bath.

In the resulting aggregatively stable suspension 20 electrodes are immersed, to which a voltage of 80 volts is applied for 15 seconds.

The electrodes with tantalum powder deppsited thereon are withdrawn from the bath after the voltage effect time period is over, and placed in a chamber where the bulk porous bodies deposited on the electrodes are sintered at a temperature of 1750° C for 30 minutes.

This treatment produces bulk porous anodes for electrolytic capacitors.

Without changing all of the above-specified conditions but by only changing the immersion depth of the electrodes in the suspension, one can very the dimensions of the resulting bulk porous anodes.

In this case the specific charge of the anodes produced with the granulometry of the starting powder of metal of 3-30 microns is 6600 microcoulombs/gram.

EXAMPLE II

A suspension, consisting of 15 $cm^3$ of a 0.4% aqueous solution of ammonium salt or carboxymethyl cellulose of celluloseglycolic acid used as a binding material, of 15 $cm^3$ of alcohol being a dispersion medium and of 100 grams of niobium powder, is carefully mixed in a bath.

20 electrodes are immersed in the resulting suspension, and voltage is applied thereto for 4 seconds, the voltage value being 40 volts.

The electrodes with the niobium powder deposited thereon are withdrawn from the bath after the voltage effect time period is over, and placed in a high-temperature medium where the resulting bulk porous bodies are sintered at a temperature of 1800° C for 30 minutes.

The production of bulk porous anodes under the above-stated conditions can be realized by a batch process used most effectively for making anodes for small-size electrolytic capacitors.

EXAMPLE III

A suspension consisting of 20 cm³ of a 0.8% aqueous solution of sodium salt or carboxymethyl cellulose of celluloseglycolic acid, 30 cm³ of acetone and 50 grams of titanium powder is carefully mixed.

20 electrodes are immersed in the resulting suspension, and voltage is applied thereto for 30 seconds, the voltage value being 10 volts.

Then sintering is effected at a temperature of 1750° C for 45 minutes.

Bulk porous anodes produced by said method can be used for making oxide-semiconductor capacitors.

What is claimed is:

1. A method of making bulk porous anodes for electrolytic capacitors, which comprises preparing a suspension consisting of a powdered valve metal selected from the group consisting of tantalum, niobium and titanium in an amount of 30–250 parts by weight, a binding material, being a charger of said powdered metal particles, constituting a 0.2–1.5% aqueous solution of a salt selected from the group consisting of sodium and ammonium salts of carboxymethyl cellulose or celluloseglycolic acid in an amount of 10–35 parts by volume, and a dispersion medium selected from the group consisting of alcohol and acetone in an amount of 15–30 parts by volume; subjecting said suspension to the effect of an electric field established by a voltage applied to electrodes and causing deposition of said powdered metal on said electrodes, and the formation of a bulk porous body on said electrodes; sintering said bulk porous body at a temperature of 1600°–2000° C to produce a bulk porous anode.

2. A method according to claim 1, wherein the value of the voltage establishing said electric field applied to said electrodes is selected from within a range of 3–100 volts.

3. A method according to claim 1, wherein said effect of said electric field on said suspension lasts for a time period of about 2 to 40 seconds.

* * * * *